(12) United States Patent
Wu

(10) Patent No.: US 11,143,377 B1
(45) Date of Patent: Oct. 12, 2021

(54) HIGH-LOW BEAM SWITCHING DEVICE

(71) Applicant: COPLUS INC., Tainan (TW)

(72) Inventor: Po-Hua Wu, Tainan (TW)

(73) Assignee: COPLUS INC., Tainan (TW)

( * ) Notice: Subject to any disclaimer, the term of this patent is extended or adjusted under 35 U.S.C. 154(b) by 0 days.

(21) Appl. No.: 17/160,477

(22) Filed: Jan. 28, 2021

(30) Foreign Application Priority Data

Aug. 26, 2020 (TW) .................................. 109129170

(51) Int. Cl.
| | |
|---|---|
| *F21S 41/689* | (2018.01) |
| *F21S 41/40* | (2018.01) |
| *B60Q 1/04* | (2006.01) |
| *F21W 102/155* | (2018.01) |

(52) U.S. Cl.
CPC .............. *F21S 41/689* (2018.01); *B60Q 1/04* (2013.01); *F21S 41/40* (2018.01); *F21W 2102/155* (2018.01)

(58) Field of Classification Search
CPC ........ F21S 41/689; F21S 41/692; B60Q 1/04; F21W 2102/13; F21W 2102/155
See application file for complete search history.

(56) References Cited

U.S. PATENT DOCUMENTS 10,359,168 B2 * 7/2019 Lee .......................... F21S 41/47

* cited by examiner

*Primary Examiner* — Robert J May
(74) *Attorney, Agent, or Firm* — Burris Law, PLLC

(57) ABSTRACT

A high-low beam switching device includes an installation housing, a high-low beam switching unit, and an actuating unit. The high-low beam switching unit includes a light occluding member movable between a low beam position and a high beam position, a retaining protrusion disposed on a downward surface of the light occluding member, and an elastic member disposed for biasing the light occluding member toward the low beam position. The actuating unit includes an actuating rod engaging the retaining protrusion and operable for driving the light occluding member to switch between the low beam position and the high beam position.

9 Claims, 3 Drawing Sheets

HIGH-LOW BEAM SWITCHING DEVICE

CROSS-REFERENCE TO RELATED APPLICATIONS

This application claims priority of Taiwanese Patent Application No. 109129170, filed on Aug. 26, 2020.

FIELD

The disclosure relates to a component of vehicle headlights, more particularly to a high-low beam switching device.

BACKGROUND

The high beam and low beam illuminations of the headlights of vehicles such as automobiles and motorcycles are generally provided through a high-low beam switching device of the light source. More specifically, the high-low beam switching device includes a light occluding member disposed in front of the light source, which can be adjusted to generate high beam and low beam illuminations at different positions thereof. Although the design and assembly of the high-low beam switching device are varied among manufacturers, the common goal is to precisely control the high beam and low beam position of the light occluding member to achieve high-low beam switching through an uncomplicated mechanism. Based on this, the automotive lighting industry's effort is to develop various high-low beam switching devices with improved configurations to meet market demand.

SUMMARY

Therefore, the object of the disclosure is to provide a high-low beam switching device with uncomplicated configuration.

According to the disclosure, a high-low beam switching device is adapted to be used with a light source, and includes an installation housing, a high-low beam switching unit, and an actuating unit. The installation housing has an accommodating space that is adapted for reflecting light emitted from the light source, and a light passage that is located at a front end of the accommodating space to allow the light to pass through. The high-low beam switching unit includes a light occluding member, a retaining protrusion, and an elastic member. The light occluding member is located in front of the light passage, and is movable between a low beam position, where the light occluding member partially shield the light passed through the light passage, and a high beam position, where the light passed through the light passage is not shielded by the light occluding member. The retaining protrusion is disposed on a downward surface of the light occluding member and defines a retaining hole. The elastic member is disposed for biasing the light occluding member toward the low beam position. The actuating unit includes an actuating rod that engages the retaining hole and that is operable for driving the light occluding member to switch between the low beam position and the high beam position.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
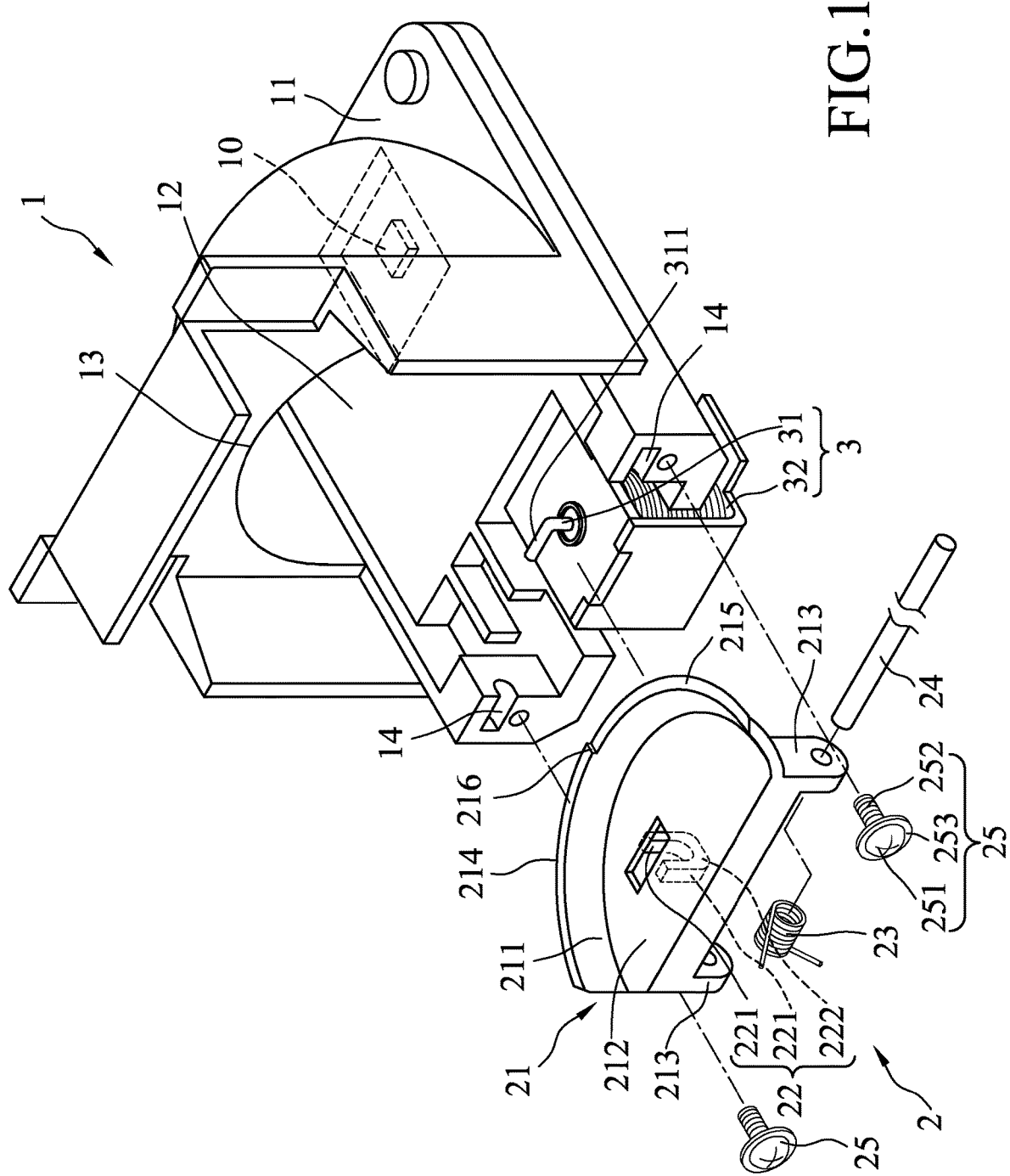
FIG. 1 is an exploded perspective view illustrating an embodiment of the high-low beam switching device according to the disclosure.
Figure 2:
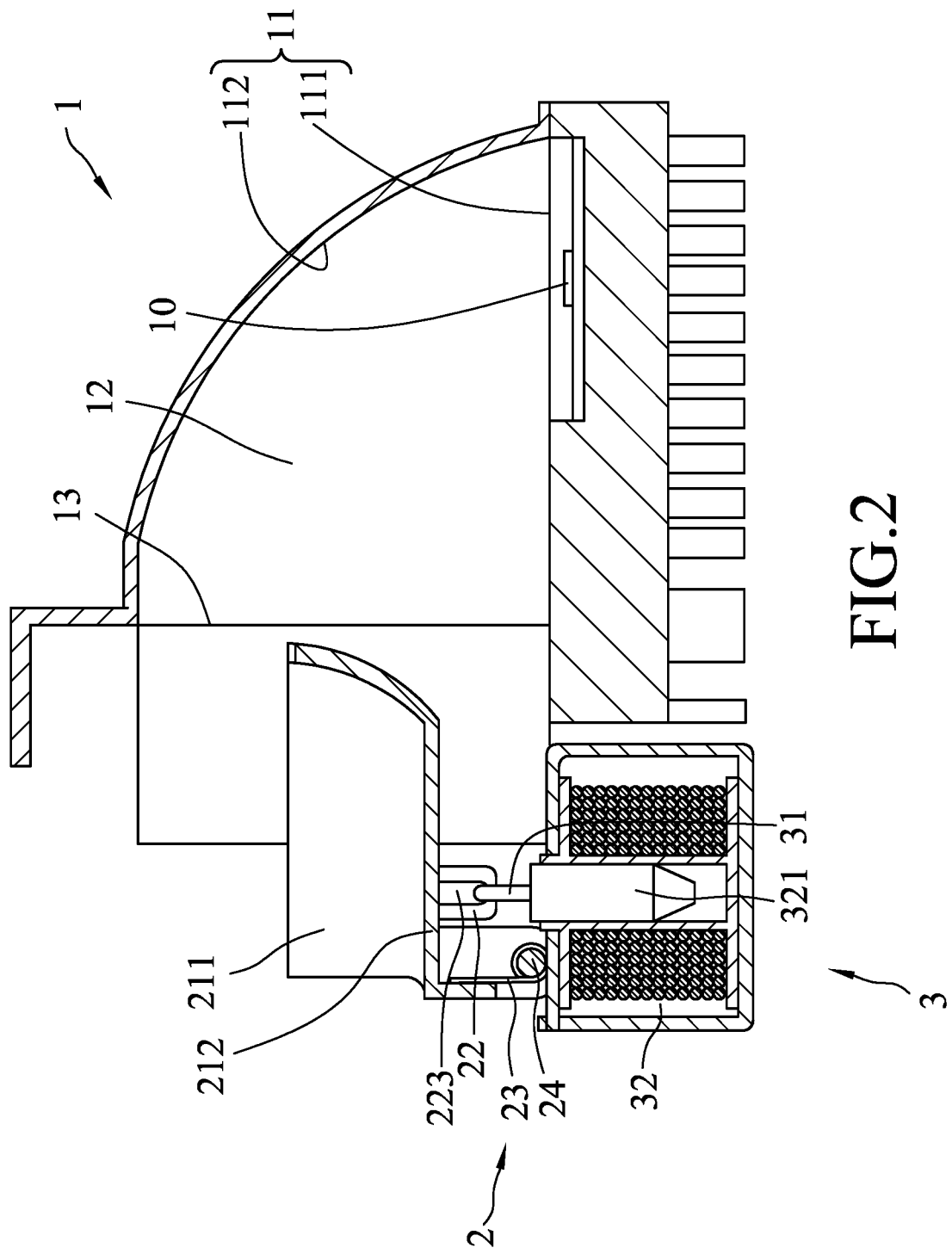
FIG. 2 is a cross-sectional view illustrating a light occluding member of the embodiment in a high beam position.

As shown in FIGS. 1 and 2, an embodiment of the high-low beam switching device according to the disclosure is adapted to be used with a light source 10 and can be applied to vehicles, such as automobiles, motorcycles, etc. The high-low beam switching device includes an installation housing 1, a high-low beam switching unit 2 and an actuating unit 3.

The installation housing 1 includes a base 11 formed with two insertion slots 14, and has an accommodating space 12 and a light passage 13. The base 11 has an upward mounting surface 111 and a curved reflecting surface 112 extending upward and forward from a rear edge of the mounting surface 111. The accommodating space 12 is defined in cooperation by the mounting surface 111 and the reflecting surface 112, the light source 10 is installed on the mounting surface 111, and light emitted from the light source 10 can be reflected by the reflecting surface 112. The light passage 13 is located at a front end of the accommodating space 12 to allow the light reflected by the reflecting surface 112 to pass through. The two insertion slots 14 are formed at opposite end portions of a front surface of the base 11.

The high-low beam switching unit 2 includes a light occluding member 21, a retaining protrusion 22, a elastic member 23, a rod shaft 24, and two fasteners 25.

The light occluding member 21 is located in front of the light passage 13 for generating a low beam illumination, and has a light baffle 211 for patterning the light, a coupling portion 212 interconnecting the light baffle 211, the rod shaft 24 and the elastic member 23, and two spaced shaft brackets 213 connected to an end of the coupling portion 212 opposite to the light baffle 211. The light baffle 211 has a first plane section 214, a second plane section 215, and an inclined plane section 216 interconnecting the first and second plane surfaces 214, 215. The first plane section 214, the second plane section 215, and the inclined plane section 216 cooperatively provide an edge for patterning the light of low beam. The light occluding member 21 is movable between a low beam position (see FIG. 3), where the light occluding member 21 partially shield the light passed through the light passage 13, and a high beam position (see FIG. 2), where the light passed through the light passage 13 is not be shielded by the light occluding member 21.

The retaining protrusion 22 has two spaced segments 221 protruding from a downward surface of the coupling portion 212 of the light occluding member 21 and being parallelly spaced apart from each other, and a connecting segment 222 connected between terminal ends of the two protruding segments 221 that are opposite to the light occluding member 21 The protruding segments 221 and the connecting segment 222 cooperatively define a retaining aperture 223 thereamong.

The elastic member 23 is disposed for biasing the light occluding member 21 toward the low beam position. In this embodiment, the elastic member 23 is a torsion spring.

The rod shaft 24 is disposed across the light occluding member 21 and extends through the two shaft brackets 213 of the light occluding member 21, with opposite ends thereof fixed in the two insertion slots 14 respectively. The elastic member 23 is disposed around the rod shaft 24.

The two fasteners 25 are positioned in front of the shaft brackets 213 for securing the light occluding member 21 to the front surface of the base 11 of the installation housing 1. Each fastener 25 has a head portion 251, a threaded portion 252 connected to the head portion 251, and a flange portion 253 extending around the head portion 251. The head portion 251 and the threaded portion 252 of each of the fasteners 25 contact the front surface of the base 11, and cover a respective one of the insertion slots 14 to retain a respective one of the opposite ends of the rod shaft 24 in a respective one of the insertion slots 14, so that the light occluding member 21, the elastic member 23, and the rod shaft 24 are secured by the fasteners 25 to the base 11. Each of the shaft brackets 213 and the head and flange portions 251, 253 of a corresponding one of the fasteners 25 are configured with a distance between them, such that the light occluding member 21 is allowed to rotate about the rod shaft 24. In this embodiment, the fasteners 25 are two flange screws.

The actuating unit 3 includes an actuating rod 31 and a power component 32. The actuating rod 31 is of a right-angled form, and has a horizontal portion 311 being remote from the power component 32 and extending through the retaining hole 223 of the retaining protrusion 22. The actuating rod 31 is operable by the power component 32 through movement of a slidable plunger 321 of the power component 32, to drive the light occluding member 21 to switch between the low beam position and the high beam position. More specifically, the horizontal portion 311 of the right-angled actuating rod 31 stops the light occluding member 21 from moving toward the low beam position under the biasing of the elastic member 23. When the power component 32 is activated to move down the horizontal portion 311 of the right-angled actuating rod 31, the light occluding member 21 is switched from the low beam position to the high beam position. Once the power component 32 is brought to a de-energized state, the horizontal portion 311 of the right-angled actuating rod 31 will be briefly out of contact from the retaining protrusion 22, thus the light occluding member 21 immediately springs back toward the low beam position under a restoring force of the elastic member 23. In this embodiment, the power component 32 which is energized to drive the movement of the actuating rod 31 is a linear solenoid. The movement amount of the actuating rod 31 can be precisely controlled by the stroke of the linear solenoid, such that the actuating rod 31 retained by the retaining protrusion 22 can accurately drive the light occluding member 21 to switch between the low beam position and the high beam position. Therefore, the high-low beam switching can be realized by the linear solenoid-operated actuating rod 31 through an uncomplicated and reliable device.

Referring to FIG. 2, when the high-low beam switching device is equipped to a headlight of the vehicle, the headlight can be switched between low beam and high beam illuminations according to the user's needs. When the high-low beam switching device is operated to provide the high beam illumination, the horizontal portion 311 of the actuating rod 31 is pulled by the slidable plunger 321 of the linear solenoid 32 to move the light occluding member 21 downward to the high beam position where the light emitted from the light source 10 and reflected by the reflecting surface 112 passes through the light passage 13 without being partially shielded. A restoring energy is stored in the elastic member 23 while the light occluding member 21 is pulled down to the high beam position.

Figure 3:
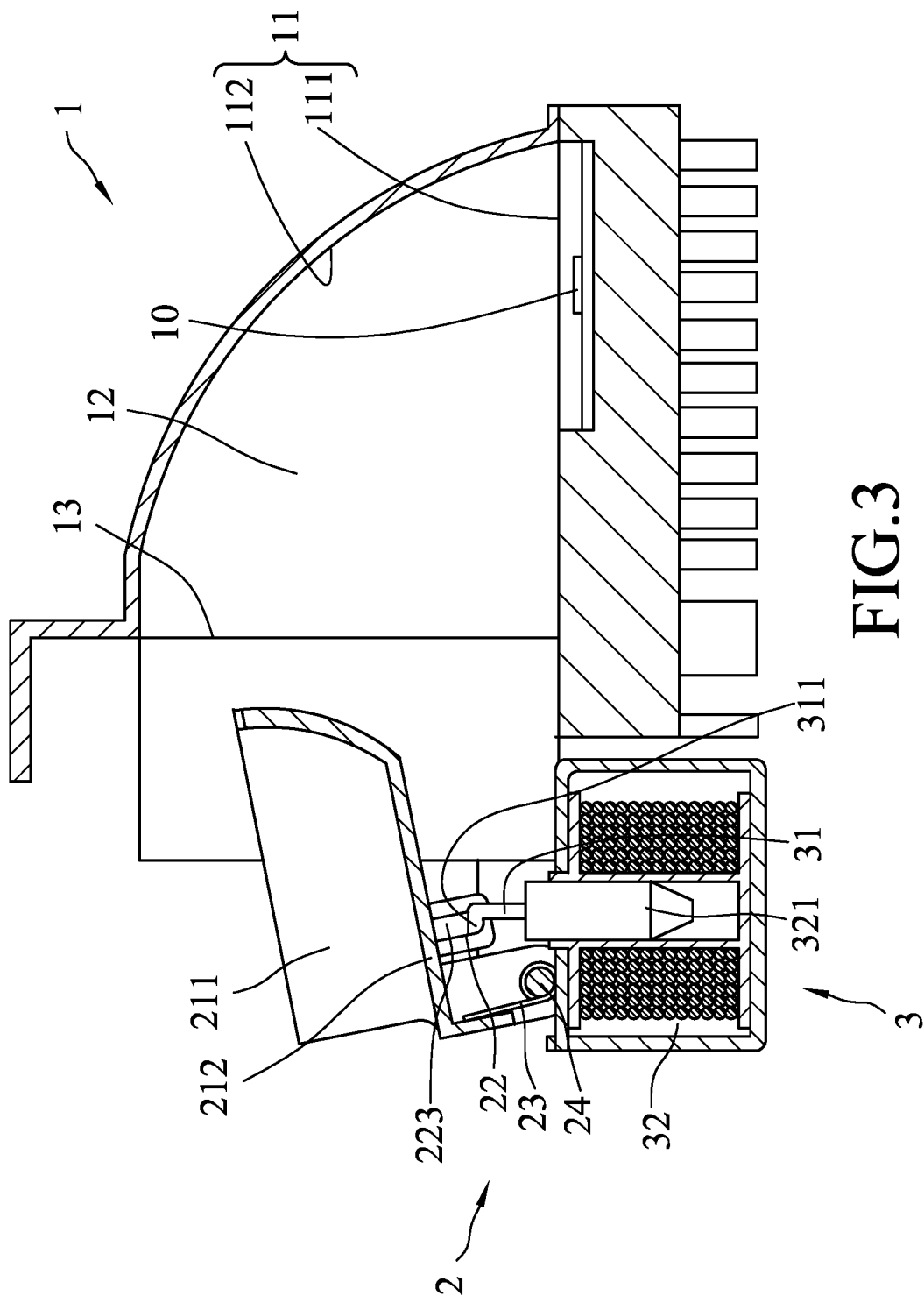
FIG. 3 is a cross-sectional view illustrating the light occluding member of the embodiment in a low beam position.

Referring to FIG. 3, when the high-low beam switch device is operated to provide the low beam illumination, the power component 32 is brought to the de-energized state. Consequently, the horizontal portion 311 of the right-angled actuating rod 31 is briefly out of contact from the connecting segment 222 of the retaining protrusion 22, and the light occluding member 21 is immediately springs back to the low beam position under the restoring force exerted against the coupling portion 212 thereof by the elastic member 23. As the light occluding member 21 flips to the low beam position, the horizontal portion 311 of the actuating rod 31 contacts the retaining protrusion 22 to maintain the light occluding member 21 at the low beam position. In the low beam position, the light baffle 211 of the light occluding member 21 will pattern the light passed through the light passage 13 such that a low beam distribution pattern is generated by the edges of the first plane section 214, the second plane section 215, and the inclined section 216 of the light baffle 211.

It is noted that, according to the high-low beam switching device of the disclosure, the power component 32 and the actuating rod 31 are arranged below the light occluding member 21 with the horizontal portion 311 of the right-angled actuating rod 31 extending through the retaining hole 223 of the retaining protrusion 22, and such arrangement allows the actuating rod 31 to control the movement of the light occluding member 21 with the smallest movement amount, and therefore a compact structure of the high-low beam switching device can be provided without ineffective space.

In summary, the high-low beam switching device of the disclosure fulfills an uncomplicated structural arrangement, so that object of the disclosure can be indeed achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A high-low beam switching device adapted to be used with a light source, comprising:
an installation housing having an accommodating space that is adapted for reflecting light emitted from said light source, and a light passage that is located at a front end of said accommodating space to allow the light to pass through;

a high-low beam switching unit including
a light occluding member that is located in front of said light passage and that is movable between a low beam position, where said light occluding member partially shield the light passed through said light passage, and a high beam position, where the light passed through said light passage is not shielded by said light occluding member,
a retaining protrusion that is disposed on a downward surface of said light occluding member and that defines a retaining hole, and
an elastic member that is disposed for biasing said light occluding member toward the low beam position; and
an actuating unit including an actuating rod that engages said retaining hole and that is operable for driving said light occluding member to switch between said low beam position and said high beam position.

2. The high-low beam switching device as claimed in claim 1, wherein said actuating unit further includes a power component for driving operation of said actuating rod.

3. The high-low beam switching device as claimed in claim 2, wherein said actuating rod is of a right-angled form, and has a horizontal portion being remote from said power component and extending through said retaining hole of said retaining protrusion.

4. The high-low beam switching device as claimed in claim 1, wherein said light occluding member has a light baffle for patterning the light emitted from said light source when said light occluding member is at the low beam position, and a coupling portion interconnecting said light baffle and said elastic member.

5. The high-low beam switching device as claimed in claim 4, wherein said light baffle has a first plane section, a second plane section, and an inclined plane section interconnecting said first and second plane sections.

6. The high-low beam switching device as claimed in claim 4, wherein said high-low beam switching unit further includes a rod shaft disposed across said light occluding member and mounted with said elastic member, and two fasteners securing said light occluding member to said installation housing.

7. The high-low beam switching device as claimed in claim 6, wherein said light occluding member has two spaced-apart shaft brackets connected to an end of said coupling portion opposite to said light baffle, said rod shaft extending through said shaft brackets.

8. The high-low beam switching device as claimed in claim 6, wherein each fastener has a head portion, a threaded portion connected to said head portion, and a flange portion extending around said head portion.

9. The high-low beam switching device as claimed in claim 1, wherein said retaining protrusion has two protruding segments that protrude from said light occluding member and that are parallelly spaced apart from each other, and a connecting segment that is connected between terminal ends of said two protruding segments opposite to said light occluding member.

* * * * *